No. 898,388. PATENTED SEPT. 8, 1908.
F. W. PARSONS.
DRILL BIT.
APPLICATION FILED JAN. 7, 1905.

WITNESSES:
INVENTOR
Frederick W. Parsons
BY
Eugene Diven
ATTORNEY

UNITED STATES PATENT OFFICE.

FREDERICK W. PARSONS, OF TARRYTOWN, NEW YORK, ASSIGNOR TO INGERSOLL-RAND COMPANY, OF NEW YORK, N. Y.

DRILL-BIT.

No. 898,388.  Specification of Letters Patent.  Patented Sept. 8, 1908.

Application filed January 7, 1905. Serial No. 240,014.

*To all whom it may concern:*

Be it known that I, FREDERICK W. PARSONS, a citizen of the United States, residing at Tarrytown, in the county of Westchester and State of New York, have invented a certain new and useful Improvement in Drill-Bits, of which the following is a specification.

This invention relates to improvements in the drill bits used in connection with rock drills of either the pneumatic hammer, or the reciprocating piston type, in drilling holes in stone, rock, and the like. In drilling stone the cutting edges of the bit become dulled very rapidly, and the bit has to be removed from time to time to be re-sharpened. The bits, of necessity, must be of considerable length, and in order that drilling operations may be continued without interruption, the operator must be supplied with a number of the bits, to the end that he may have sufficient sharpened tools at hand to keep the work going while the dulled bits are being re-dressed. The bulk and weight of this supply of extra bits must be carried by the operator to the place of working and back and forth to the tool dresser.

It is my object, therefore, to provide a drill bit of the required length, with short detachable cutting heads of small bulk and comparatively light weight, a supply of which can be carried by the driller without inconvenience. This also avoids the expense of the long shank for each cutting head where the bits are all of one piece. In making such a jointed bit it is essential that the parts be united so firmly that they cannot come apart while the bit is in the hole, and they also must be so coupled together that the cutting head will be rotated with the shank in the operation of drilling. I attain my object by constructing the drill bits in the manner illustrated in the accompanying drawings, in which—

Figures 1, 2, 3:
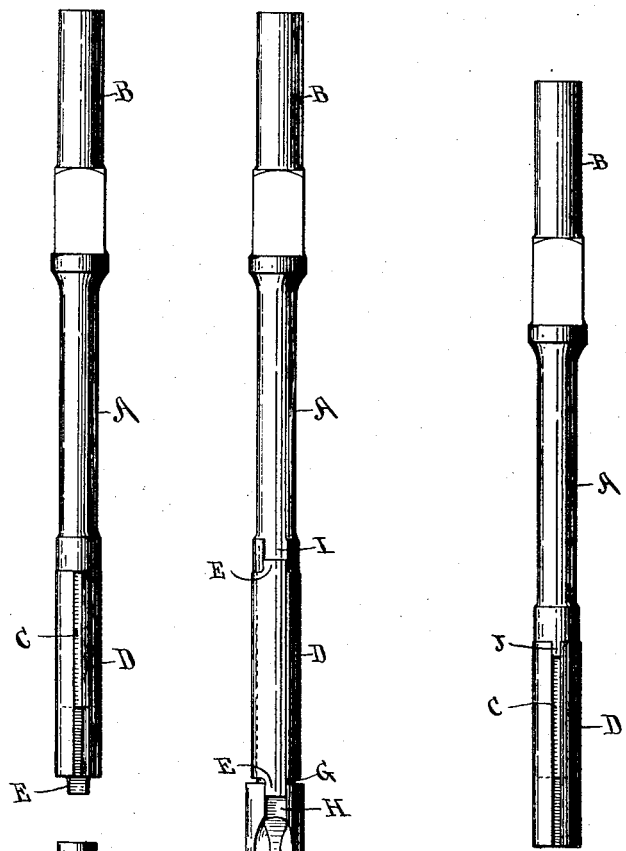
Figure 4:
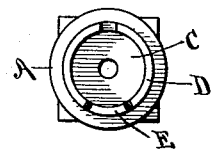

Figure 1 shows in elevation one side of my drill bit, with the cutting head detached; Fig. 2, an elevation of the reverse side with the cutting head joined to the shank; Fig. 3, a side elevation showing a modified form of the coupling joint; and Fig. 4, an end view of the shank of the bit without the cutting head.

Like letters of reference designate like parts in the several views.

A represents the shank of the tool, which is made of a length to correspond with the depth of the holes to be drilled. The upper end of the shank at B is formed to fit either the socket in a drilling hammer, or the chuck end of the piston in a reciprocating drill. At the other end, the shank is provided with a collar and reduced portion C, upon which is sprung a split sleeve D of spring steel, or other suitable metal, said sleeve before being sprung in place having a diameter somewhat smaller than the diameter of the shank at C. The cutting head F is short, being of a length just sufficient to carry the cutting edges or blades of the tool, and is provided with a shank G, which is adapted to be inserted in the sleeve D, and to abut when in place against the portion C of the shank A. This shank G is of a diameter slightly larger than the inside diameter of the sleeve D, so that some force is required to insert the shank in the sleeve. By reason of this difference in diameter and the elasticity of the sleeve, the sleeve will grip the shank G so firmly that it cannot be displaced while the bit is working its way into the hole that is being drilled, nor left in the hole when the shank is withdrawn. To facilitate the insertion of the shank G in the sleeve, the edges of the two will be slightly beveled.

In order to insure the rotation of the cutting head with the shank of the bit, I provide the sleeve D at each end with the projecting tongues E, which engage slots H and I cut in the head F and in the collar on shank A, as shown in Fig. 2.

Other means for locking the shank and cutting head to the sleeve D may be employed; as, for instance, the modification shown in Fig. 3, in which the shank and cutting head are provided with tongues at J and K, respectively, which engage the groove formed by the split in the sleeve D. Some little force is required to withdraw the cutting heads F from the sleeve D, but it can be readily done by tools with which the driller will be supplied.

It will be evident that by means of a drill bit constructed in the above manner there will be attained economy in the use of metal in constructing the bits; inasmuch as one shank will suffice for use in connection with a large number of cutting heads, said cutting heads being made with different forms of teeth or cutting edges, to conform with the work in hand, and furthermore, that said cutting heads will be so small in bulk and light of weight that a quantity of them can be carried by the driller without inconvenience.

Having thus described my improved bit, and without confining myself to the particular means for coupling the cutting heads to the shank herein described, what I claim as my invention and desire to secure by Letters Patent is—

1. A drill bit comprising a shank having an elastic cylindrical metal sleeve projecting from one end, and a cutting head adapted to be forced into and out from the projecting end of said sleeve.

2. A drill bit comprising a shank and a cutting head, the contiguous ends of which are placed one against the other, in combination with an elastic cylindrical metal sleeve into the opposite ends of which the shank and head are forced to couple them together, and means for preventing the rotation of said parts with reference to one another.

3. A drill bit comprising a shank and cutting head united by an elastic metal sleeve split longitudinally, into the opposite ends of which the two are forced, said sleeve being also coupled to the shank and to the head by tongue and groove joints.

In testimony whereof I have affixed my signature, in presence of two witnesses.

FREDERICK W. PARSONS.

Witnesses:
M. E. VERBECK,
A. S. DIVEN.